May 5, 1942.  C. S. HAMILTON  2,281,840

AIR DEFLECTOR FOR MOTOR VEHICLES

Filed Sept. 28, 1940

Inventor
CLARK S. HAMILTON,
By James N. ——
Attorney

Patented May 5, 1942

2,281,840

UNITED STATES PATENT OFFICE 2,281,840

AIR DEFLECTOR FOR MOTOR VEHICLES

Clark S. Hamilton, San Diego, Calif.

Application September 28, 1940, Serial No. 358,907

1 Claim. (Cl. 296—44)

This invention relates to air deflectors and has particular reference to deflectors for use in the window openings of motor vehicles.

It is an object of the present invention to provide an air deflector so constructed as to be detachably mounted in the vehicle window opening and so shaped as to deflect the air stream outwardly of the vehicle.

The peculiar construction of vehicles is such that the air striking the windshield divides, with a portion flowing over the top of the vehicle and the rest flowing around the sides and entering the window adjacent the rear of the opening. This movement of the air causes an unpleasant and disturbing sound and seriously interferes with the operator's duties by striking him upon the side of the head.

A further object of the invention is to provide a deflector so constructed and shaped as to be quickly and conveniently arranged in position in the rear of the window opening, extending into the car in such manner as to catch the air currents flowing from the windshield and direct them outwardly.

A further and important object of the invention is the provision of a deflector of the above mentioned characteristics adapted to position in the window opening, yet will not interfere with the normal operation of the conventional window.

A further object of the invention is the provision of such a device that is extremely simple in construction, is strong, durable, cheap to manufacture and is highly convenient in use.

Figure 1:
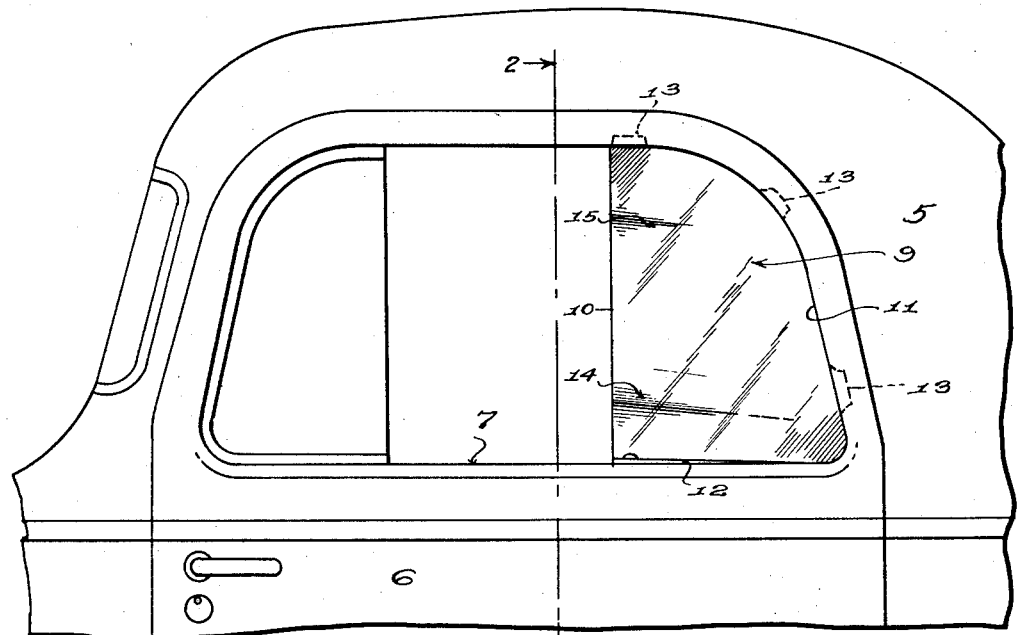
Figures 2, 3, 4, 5:
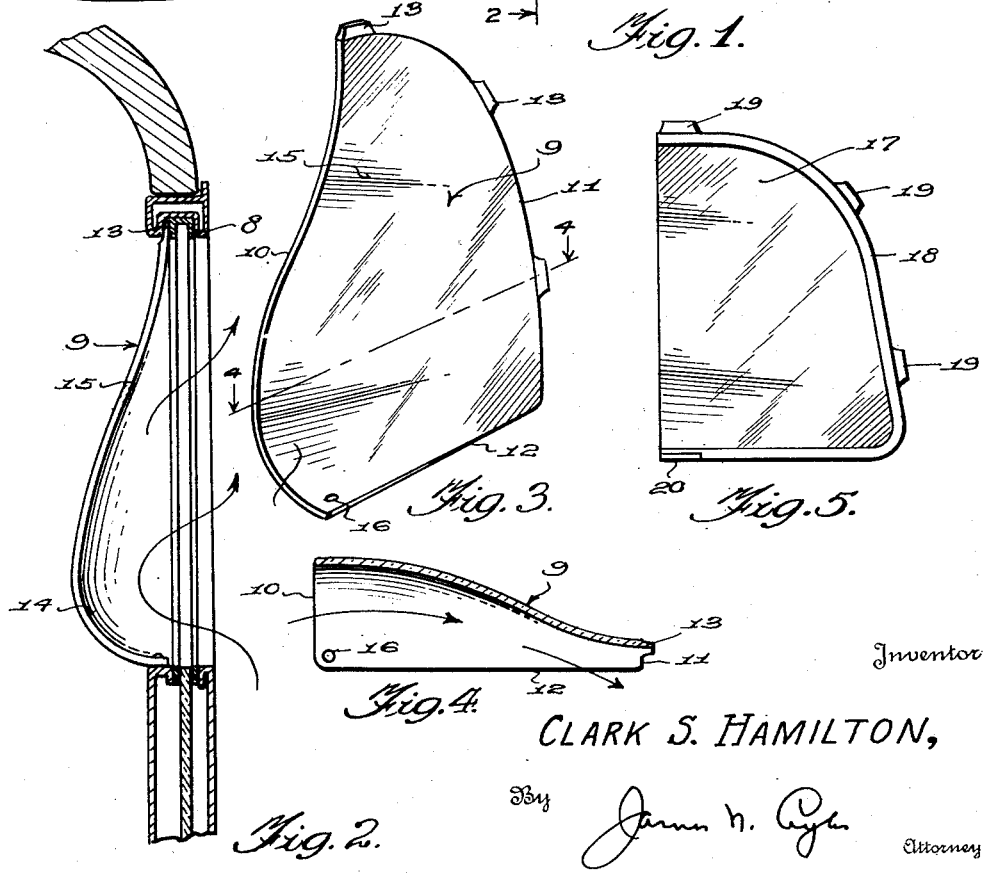

Other and important objects of the invention will present themselves during the course of the following description, reference being had to the accompanying drawing, wherein:

Figure 1 is a fragmentary side elevation of a motor vehicle, showing a window opening and the invention in use, Figure 2 is a section taken on line 2—2 of Figure 1, Figure 3 is a perspective view of the deflector, Figure 4 is a horizontal section taken on line 4—4 of Figure 3, and Figure 5 is a side elevation of a modified form of the invention.

Referring specifically to the drawing, the numeral 5 designates the body portion of a motor vehicle having a door 6 and window opening 7, as is customary. The door and window are of conventional construction and embodies the usual sliding glass and may or may not have the usual vertically pivoted ventilator. The window opening is provided with the usual felt channel guide 8 for the sliding glass.

The numeral 9 designates the deflector as a whole, formed of a suitable transparent material, such as glass. The deflector 9 is illustrated as being provided with a straight forward edge 10 and a rear curved edge 11. The edge 11 will obviously vary in curvature to adapt itself to various makes of vehicles. The lower edge 12 of the deflector is preferably formed straight and at right angle to the edge 10, to conform to the line of the sill of the window opening. Formed upon the top and rear edge of the deflector are a plurality of attaching lugs 13, relatively thin and adapted to be inserted between the felt guide 8 and the metal frame of the door. Obviously, these lugs may be formed separate and attached to the deflector in any convenient manner.

As previously pointed out, it is the object of the invention to catch and deflect the air stream outwardly of the vehicle and, to accomplish this the deflector is provided with an inwardly curved portion 14, serving as a pocket to scoop up the inrushing air and this curved portion again curves outwardly as at 15 to a point where it is in vertical alignment with the lower edge 12. The curved portions gradually merge into a substantially flat plane adjacent the rear edge 11. It should be here understood that the specific curvature of the deflector may vary to suit the particular needs of various types of vehicles. In some instances, it may be found desirable to employ a plain flat sheet for the deflector. As clearly shown in Figure 2, the deflector 9 lies wholly within the body of the vehicle and the mounting arrangement is such as to permit the uninterrupted use of the conventional sliding window glass. Therefore, there would be no need for dismounting the device every time the window must be closed.

It may be found desirable in some cases to provide a more permanent attaching means for the device, other than and in conjunction with the lugs 13, and to accomplish this, an opening 16 may be formed in the deflector adjacent the junction of the edges 10 and 12. A screw or like fastening means may be inserted through this opening and engage in an opening of the window sill. However, it has been found that under normal conditions, the engagement of the lugs 13 as before pointed out will firmly hold the device in place, aided by the pressure of the air stream against the deflector.

In Figure 5 a modified form of the invention has been illustrated. The numeral 17 indicates the deflector which is provided with a metal edge 18 on which are formed lugs 19 corresponding to the lugs 13. An attaching lug 20 may likewise be provided, corresponding to the opening 16.

It will be seen from the foregoing that an extremely simple and efficient form of deflector has been provided. The device is easily and quickly mounted and will efficiently deflect undesirable drafts from the interior of the vehicle. The device is cheap to manufacture and may be formed of a plurality of transparent materials now upon the market.

It is to be understood that the invention is not limited to the precise form shown but that it includes within its purview whatever changes fairly come within either the terms or the spirit of the appended claim.

What I claim as new and desire to secure by Letters Patent is:

In combination with a side window of an automobile, said window having the usual vertically sliding glass for closing the same and guides for said glass, an air deflector comprising a sheet of transparent material shaped to provide bottom, rear and top edges which align with and are provided with engaging means engaging between the glass guides and the frame of the window at the inner side of the window opening, the forward edge of the sheet being inwardly bowed to present a slow inward curve at the top of the sheet which merges adjacent the horizontal central line into a much sharper outward curve toward the bottom of the sheet, both of said curved portions merging into a plane surface toward the rear edge of the sheet which plane surface lies in substantially vertical alignment with said engaging means, and means adjacent the lower forward corner of the sheet for securing said sheet to the window sill.

CLARK S. HAMILTON.